(12) United States Patent
Graves et al.

(10) Patent No.: US 6,832,168 B2
(45) Date of Patent: Dec. 14, 2004

(54) METHOD AND SYSTEM FOR VERIFYING NETWORK DEVICE POWER CABLING CONFIGURATION

(75) Inventors: David A. Graves, Monte Sereno, CA (US); Parvathi Nair, Sunnyvale, CA (US); Vikram Ramesh, Cupertino, CA (US); Narendra Lakshminarasimha, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 10/407,757

(22) Filed: Apr. 4, 2003

(65) Prior Publication Data

US 2004/0199342 A1 Oct. 7, 2004

(51) Int. Cl.[7] .............................................. G01R 21/00
(52) U.S. Cl. .................................. 702/60; 324/76.11
(58) Field of Search .......................... 702/60; 324/76.11

(56) References Cited

U.S. PATENT DOCUMENTS

| | | | | |
|---|---|---|---|---|
| 4,651,084 A | * | 3/1987 | Welsh et al. | 324/523 |
| 6,351,831 B1 | * | 2/2002 | Sawdy et al. | 714/48 |
| 6,385,561 B1 | * | 5/2002 | Soraghan et al. | 702/185 |
| 6,640,272 B1 | * | 10/2003 | Hartwell et al. | 710/104 |
| 2003/0085621 A1 | * | 5/2003 | Potega | 307/18 |
| 2003/0204611 A1 | * | 10/2003 | McCosh et al. | 709/230 |
| 2004/0064275 A1 | * | 4/2004 | Rakshani et al. | 702/60 |
| 2004/0095933 A1 | * | 5/2004 | Lehr et al. | 370/389 |

* cited by examiner

*Primary Examiner*—Edward Raymond

(57) ABSTRACT

A method and system for verifying network device power cabling configuration. Specifically, in one embodiment, the method begins by reading a map that outlines designed cabling information. The cabling information describes how power from a plurality of power sources is applied over a plurality of cables to a plurality of computing resources in a network. A power test sequence is then performed independently on each of the plurality of computing resources to verify the cabling information. During the test sequence for each of the plurality of computing resources, power is applied continuously. Thereafter, a report is generated that details results from performance of the power test sequence on each of the plurality of computing resources.

30 Claims, 10 Drawing Sheets

1000

Message 1010

Pass Condition ~ 1012

Power Cable ~ 1014
        Power Source ~ 1016
        Destination Computing Resource ~ 1018

Message 1020

Cable Exception Condition ~ 1022

Power Cable ~ 1024
        Power Source ~ 1026
        Destination Computing Resource ~ 1028

Message 1030

General Cable Exception Condition ~ 1032

Computing Resource ~ 1034

Message 1040

Stray Cable Exception ~ 1042

Computing Resource ~ 1044

Fig. 10

METHOD AND SYSTEM FOR VERIFYING NETWORK DEVICE POWER CABLING CONFIGURATION

TECHNICAL FIELD

The various embodiments of the present invention relate to data centers of computing resources. More specifically, various embodiments of the present invention relate to the verification of network device power cabling configuration of computing resources.

BACKGROUND ART

Modern networking continues to provide an improvement in communication and information access. As an example, in-house data centers, associated with a particular entity or interrelated group of users, could contain a large number of information technology (IT) resources that are interconnected through a network. The resources in the in-house data centers are traditionally managed by network administrators.

Traditional in-house data centers consist of a conglomerate of many unique IT environments. Each of the IT environments are grown and managed specific to the needs of their particular IT environment. As such, computing resources in each of the environments of the in-house data center are in part constantly being physically replaced, physically switched around from IT environment to IT environment, physically removed, physically added, etc.

Moreover, the IT environments are often patched together to form the in-house data center. As such, the network or data center of computing resources can be large and complex. This patchwork infrastructure containing the IT environments in the in-house data center can create a number of challenges. In particular, verification of the correctness of power cabling between automatic power controllers and network computing resources in the in-house data center can be difficult and costly.

Prior Art FIG. 1 is a block diagram illustrating cabling of the network 100 of computing resources. The network 100 includes a plurality of n computing resources, including device 110, device 120, device 130, on up to the n-th device, device 140. The computing resources can include network switches, routers, firewalls, load balancers, terminal servers, and computers.

The network 100 also comprises power controller 150 and power controller 160 which provide redundant power to the plurality of n computing resources. Power controller 150 comprises a plurality of power sources, as follows: power port 151, power port 153, power port 155, on up to the n-th power port 157. Correspondingly, power controller 160 comprises a plurality of power sources, as follows: power port 161, power port 163, power port 165, on up to the n-th power port 167.

Power controller 150 provides power to each of the plurality of computing resources in the network 100. Alternatively, the plurality of computing resources could consume power in a subset of the network 100 and comprise a rack of computing devices. More particularly, power controller 150 provides power to device 110 from power port 151 via cable 152. Power controller 150 also provides power to device 120 from power port 153 via cable 154. Power controller 150 also provides power to device 130 from power port 155 via cable 156. Power controller 150 also provides power to device 140 from power port 157 via cable 158.

Power controller 160 provides power to each of the plurality of computing resources in the network 100. Alternatively, the plurality of computing resources could consume power in a subset of the network 100 and comprise a rack of computing devices. More particularly, power controller 160 provides power to device 110 from power port 161 via cable 162. Power controller 160 also provides power to device 120 from power port 163 via cable 164. Power controller 160 also provides power to device 130 from power port 165 via cable 166. Power controller 160 also provides power to device 140 from power port 167 via cable 168.

As shown by Prior Art FIG. 1, supplying power from the power controllers 150 and 160 to the plurality of computing devices in the network 100 involves a complex configuration of cables. The complexity of the configuration of cables increases as the number of power controllers, the number of computing resources, and the degree of redundancy increases. As such, verification of the configuration of cables can also be complex, tedious, expensive, and time consuming.

Previously, manual processes were implemented to verify the correctness of power cabling to the plurality of computing resources in the network 100. One such process involved supplying power via a single power source (e.g., a cable from a single power port of a particular power controller) to a single computing resource, waiting for the computing resource to boot up in a power-up sequence, contacting the computing resource, and waiting for a reply from the computing resource. In this process, all other power sources, including those from other power controllers, are shut down. After verification of the power source, power to the computing resource would be cut off. This process would be repeated for every power source that supplies power to the computing resource.

Specific problems associated with the manual verification include the complex, tedious and inefficient nature of the process. In order to reduce the complexity of the verification process, and properly verify the power cabling to the plurality of computing resources in the network, the verification process is performed device by device, and power source by power source using the previously described manual process. However, this requires having a technician wait through several power-up sequences to test each individual computing resource.

Increasing the number of computing resources and redundant power sources to each computing resource would necessarily increase the amount of time for the technician to wait during power-up sequences when testing the entire network 100, leading to an inefficient use of the technician's time. Further, during power cable verification, the computing resources are all down during the power cable verification process. This leads to an inefficient use of the computing resources, especially as the number of computing resources being tested and the number of redundant power sources increases.

As a default inspection process, because the manual process of testing power cabling to the network 100 is so complex, tedious, and costly, network administrators tend to rely on visual inspections of the power cabling to the computing resource in the network 100. This visual inspection does not require a rigorous testing of the computing resources, and therefore less reliable.

Ultimately, by using visual inspections to verify power, problems in the power cabling of the computing resources in the network 100 are discovered at the most inopportune time: when there is an actual failure in the implementation of redundant power to a computing resource. For example, one of a multiple sources of redundant power to a device fails. Unfortunately, power to the computing device would not be supplied if there is improper cabling of the remaining redundant power sources available to the computing device. At a minimum, this would lead to downtime of the computing resource and an increase in the time for accomplishing the tasks assigned to that computing resource.

DISCLOSURE OF THE INVENTION

A method and system for verifying network device power cabling. Specifically, in one embodiment, the method begins by reading a map that outlines designed cabling information. The cabling information describes how power from a plurality of power sources is supplied over a plurality of cables to a plurality of computing resources in a network. A power test sequence is then performed independently on each of the plurality of computing resources to verify the cabling information. During the test sequence for each of the plurality of computing resources, power is applied continuously. Thereafter, a report is generated that details results from performance of the power test sequence on each of the plurality of computing resources.

BRIEF DESCRIPTION OF THE DRAWINGS

The above and other objects and advantages of the present invention will be more readily appreciated from the following detailed description when read in conjunction with the accompanying drawings, wherein:

Prior Art

FIG. 10 is a report illustrating messages listing pass and exception results from testing power cabling configurations of computing resources in a data center, in accordance with one embodiment of the present invention.

BEST MODES FOR CARRYING OUT THE INVENTION

Figure 1:
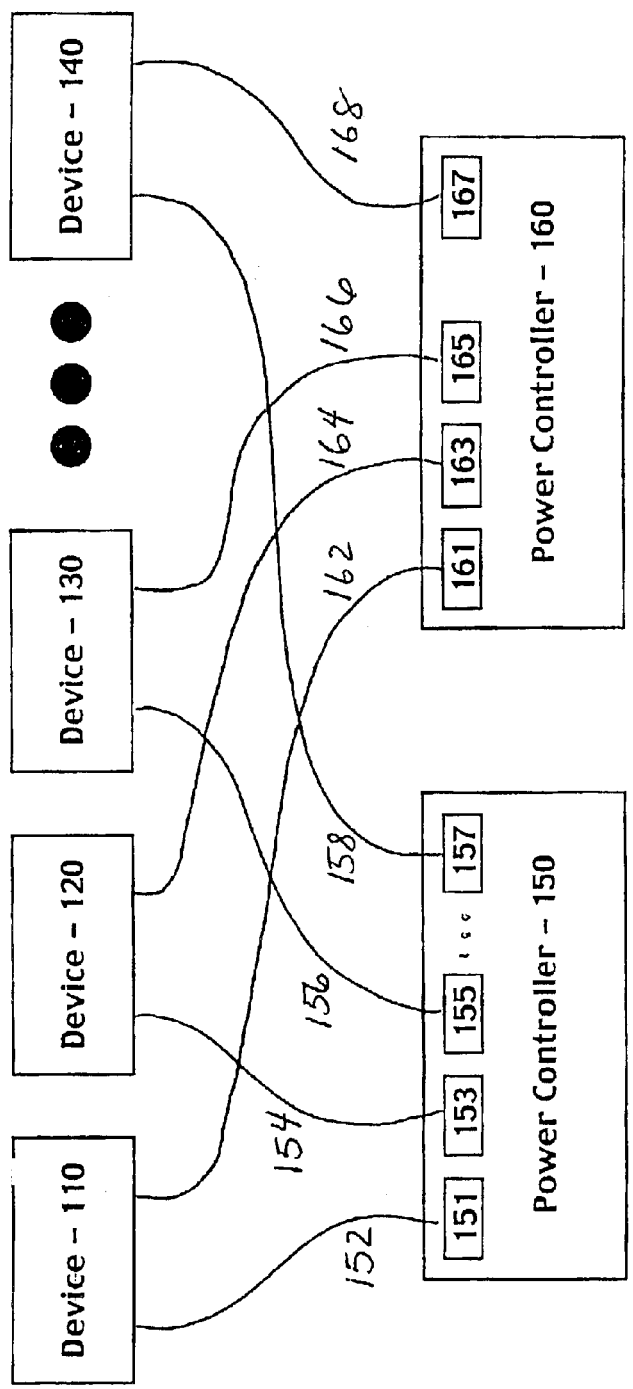
FIG. 1 is a block diagram illustrating a configuration of power cables for supplying power to a network of computing resources.

Reference will now be made in detail to embodiments of the present invention, a method and system for verifying the configuration of network device power cabling in a data center, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing real-time video and audio communication within a virtual environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading," or "performing," or "supplying," or "contacting," or "verifying," or "generating," or "determining," or "denying," or "applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for verifying the configuration of power cabling of computing resources in a data center. As a result, other embodiments of the present invention serve the above purpose and provide for the automatic verification of the configuration of power cabling of computing resources, resulting in increased efficiency when managing computing resources in a data center. Additionally, other embodiments of the present invention serve the above purposes and provide for the testing of computing resources having multiple power cables supplying power while performing a power-up sequence on the computing resource only once, resulting in increased testing efficiency. Furthermore, still other embodiments of the present invention serve the above purposes and provide for the automatic discovery of misplaced or malfunctioning power cables supplying power to computing resources in a data center, resulting in improved tracking and management of supplying power to computing resources in a data center.

Figure 2:
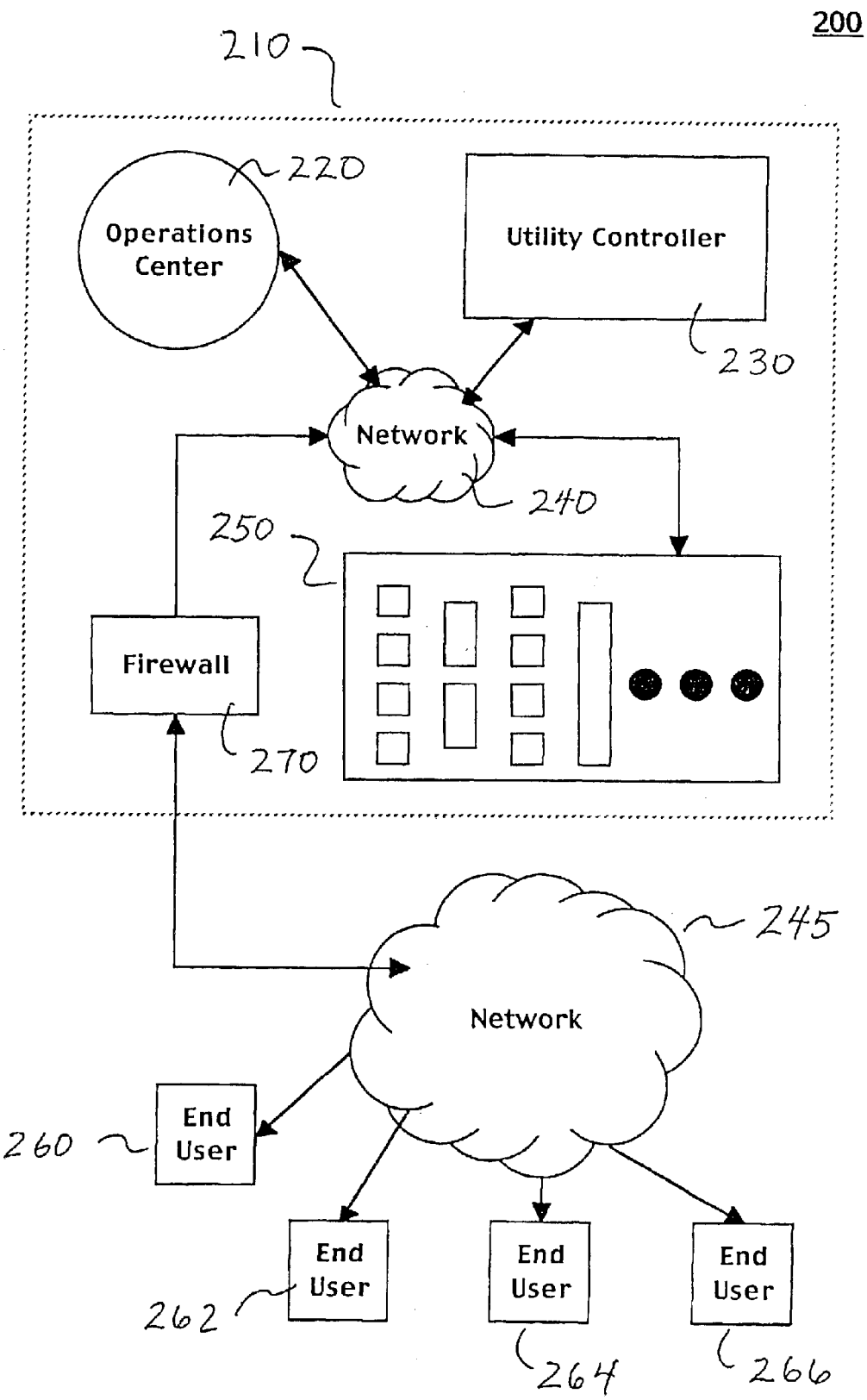
FIG. 2 is a block diagram illustrating a network system including a data center that is capable of verifying the configuration of power cabling to computing resources to a plurality of end users, in accordance with one embodiment of the present invention.

Referring now to FIG. 2, a block diagram of a networked system 200 illustrates the functionality of a utility data center (UDC) 210 with a plurality of end users, in accordance with one embodiment of the present invention. System 200 is comprised of the UDC 210 which is coupled through a network 245, such as, a virtual private network (VPN) or the Internet, to a plurality of end users (e.g., end users 260, 262, 264, 266, etc.) through the network 245. The UDC 200 is capable of verifying the configuration of power cables to computing resources.

The UDC 210 of FIG. 2 is comprised of an operations center 220 that is coupled through a network 240 (e.g., a local area network) to a utility controller 230, and a pool 250 of computing resources. The UDC 210 provides for a scalable and programmable solution for allocating computing resources that automates the creation, monitoring, and the metering of a wide variety of computing environments.

In one embodiment, the UDC 210 is a provisional UDC. As such, the UDC 210 utilizes a programmable infrastructure that enables the virtual connection of any computing resource as well as the isolation of a set of computing resources, thereby ensuring the security and segregation of computing resources at the lowest infrastructure level. As such, the UDC 210 can create and manage a plurality of virtual farms, each of which utilize a set of computing resources in the UDC 210.

The operations center 220 provides for overall control over the UDC 210. In one embodiment, the operations center 220 is manned by network technicians that monitor the management and allocation of computing resources in the UDC 210. The network technicians also provide for the installation and repair of physical resources in the pool 250 of computing resources. Also, the operations center acts as an interface between the UDC 210 and the plurality of end users. The operations center 220 can be coupled to the plurality of end users through the network 245. In addition, a firewall 270 can provide one form of additional security for the UDC 210 when communicating through the network 245.

The pool 250 of computing resources in the UDC 210 is comprised of a pre-wired, pre-integrated, and pre-tested plurality of physical resources that form a pool from which multiple farms can be created on demand. The computing resources include, but are not limited to, the following: servers, switches, computers, appliances (e.g., load balancers and firewalls), and network elements. The computing resources in the pool 250 are physically pre-wired (ideally a one-time wiring solution) and then dynamically, and logically re-wired into various virtual farm environments. The computing resources can be logically re-wired using virtual local area network technology (VLAN), in one embodiment.

In another embodiment, the UDC 210 supports multi-vendor and open system support for the plurality of computing resources in the pool 250. As such, the UDC 210 can provide support to computing resources in the pool 250 that have the same functionality (e.g., firewalls) but are provided by different vendors. Also, the UDC 210 can support the various operating systems that each of those computing resources may use.

The utility controller 230 enables the deployment segmentation, and management of resources and farms. The farms deployed with computing resources from the pool 250 can be tailored to meet a wide variety of services. Each farm has its own dedicated computing and appliance resources. The farms can share common resources, such as storage and networking fabric.

The utility controller 230 manages the pool 250 of computing resources in the UDC 210. Specifically, the utility controller 230 ensures the segmentation of farms, thereby securely isolating one farm from other farms. Also, the utility controller 230 monitors all deployed farms, and automatically re-deploys replacement resources if there are any failures in computing resources detected. In addition, the utility controller 230 monitors shared infrastructure resources, alerting the operations center of failures or other significant events, such as, intrusion attempts.

Although embodiments of the present invention disclose the verification of the correctness of power cabling to computing resources in a data center, other embodiments are well suited to the verification of power cabling configuration of computing resources in any data network or network of computing resources. In addition, other embodiments are well suited to the verification of the correctness of power cabling configuration of computing resources in a provisional data center. Still other embodiments are well suited to the verification of the configuration of interrelated computing resources, such as, the configuration of power cables to computing resources that are located on a rack that contains the interrelated computing resources.

Figure 3:
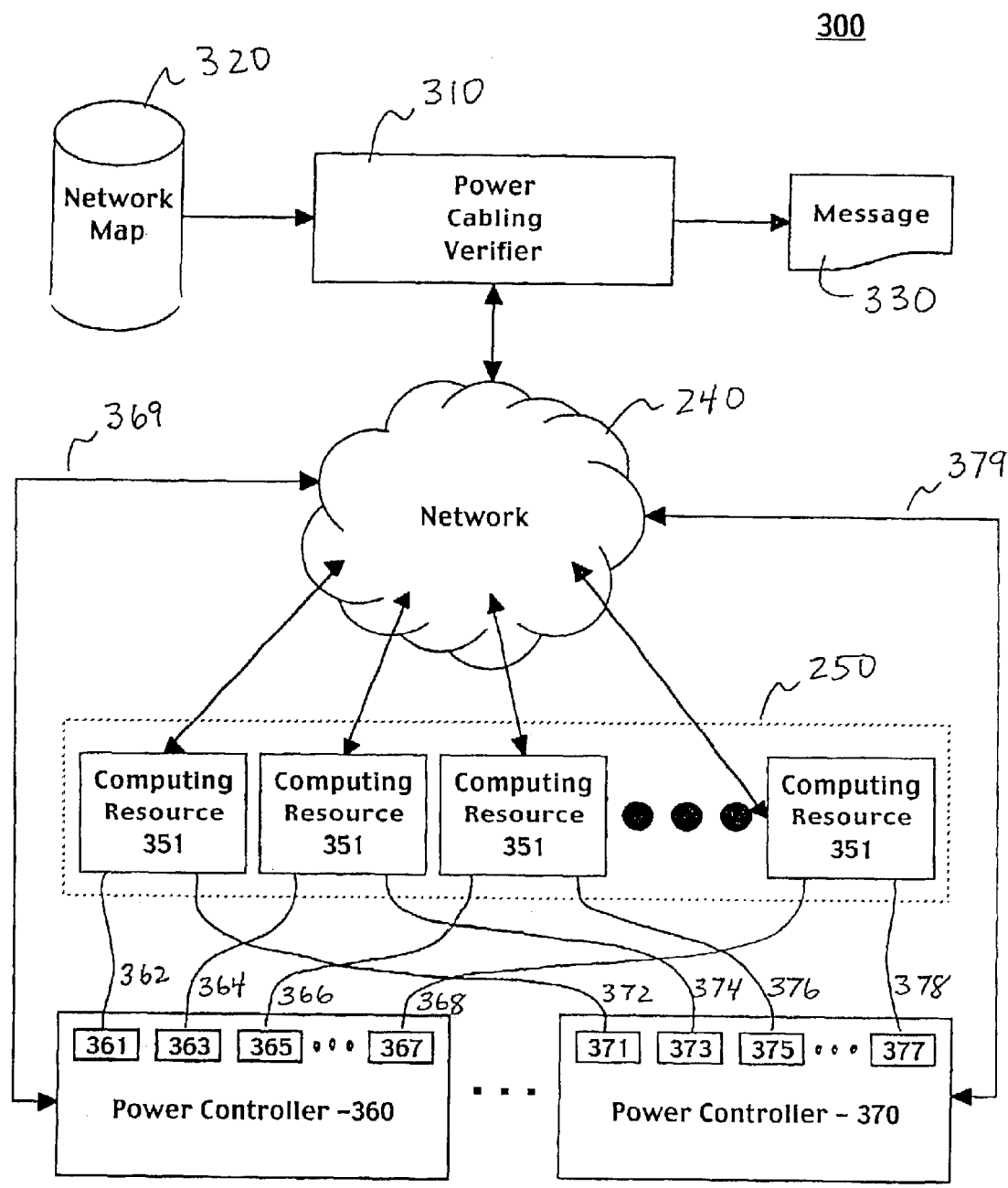
FIG. 3 is a data flow diagram illustrating the flow of information when verifying the configuration of power cabling to computing resources in a data center, in accordance with one embodiment of the present invention.

FIG. 3 is a data flow diagram illustrating the flow of information between several elements of a system 300 that reside within an UDC, in accordance with one embodiment of the present invention. The system 300 provides for the verification of the configuration of power cabling in a network of computing devices. By way of illustration only, the system 300 can reside on, or interact with, the UDC 210 of FIG. 2.

The system 300 is comprised of a power cabling verifier 310 that is coupled to a network map 320. The power cabling verifier 310 is coupled to a network 240, as shown in FIG. 2, that is internal to the UDC 210 to provide communicable coupling with the pool 250 of computing resources (e.g., the first computing resource 351, the second computing resource 352, computing resource 355, on up to the n-th computing resource 155). The power cabling verifier 310 is capable of implementing a method for verifying the configuration of the power cabling supplying power to the pool 250 of computing resources in a network. In one embodiment, the cabling verifier 310 performs the verification automatically.

The system 300 is also comprised of a plurality of power controllers that supplies power to the pool 250 of computing resources. In FIG. 3, power controller 360 and power controller 370 supplies power to the pool 250 of computing resources. Power is continually available from each of the power controllers 360 and 370 through their respective power sockets. For example, power controller 360 supplies and controls power through power sockets 361, 363, 365, on up to the n-th power socket 367. Power controller 370 supplies and controls power through power socket 371, 373, 375, on up to the n-th power socket 377.

In addition, in one embodiment, the power controllers 360 and 370 supply power automatically in response to commands that dictate when to apply power through each of the power sockets and when to disengage power through each of the power sockets. The commands are initiated through the UDC that is controlling the power controllers 360 and 370. As shown in FIG. 3, commands to power controller 360 are communicated through line, 369. Correspondingly, commands to power controller 370 are communicated through line 379.

The network map 320 is a machine-readable network map. The network map 320 contains power information pertaining to the configuration of power cabling supplying power to each of the computing resources in the pool 250. Specifically, the power information contained within the network map 320 includes the configuration of the power cabling to each of the plurality of computing resources in the pool 250.

The network map 320 is comprised of power information that is known to be correct. That is, the power information describes the designed configuration of the power cabling of the computing resources in a data center. Accuracy of the network map 320 is paramount in establishing a data center of provisionable computing resources.

The power information provides device type information for each of the computing resources in the data center, in one embodiment of the present invention. As described previously, the type of computing resources include, but is not limited to, the following: switches, computers, load balancers, routers, firewalls, etc. Moreover, the power information includes a representation of the source and destination of each power cable. For example, for each power cable, the power information describes the identification of the power socket (socket ID) of a particular power controller as the source of the power cable. In addition, the power information describes a computing resource as the destination of the power cable.

For example, power controller 360 and power controller 370 supply power to each of the computing resources in the pool 250. As such, the power information contains configuration information for power cables originating from power controller 360 and supplying power to the destination computing resources in the pool 250. Also, the power information contains configuration information for power cables originating from power controller 370 and supplying power to the destination computing resources in the pool 250. In particular, Table 1 lists the power information including source and destination of each of the power cables in FIG. 3.

TABLE 1

Configuration of Power Cables

| Power Cable | Source Power Socket ID | Power Controller | Destination Computing Resource |
| --- | --- | --- | --- |
| 362 | 361 | 360 | 351 |
| 364 | 363 | 360 | 353 |
| 366 | 365 | 360 | 355 |
| 368 | 367 | 360 | 357 |
| 372 | 371 | 370 | 351 |
| 374 | 373 | 370 | 353 |
| 376 | 375 | 370 | 355 |
| 378 | 377 | 370 | 357 |

As shown in FIG. 3, one or more power controllers redundantly supply power to each of the computing resources. In particular, both power controller 360 and power controller 370 supply redundant power to each of the computing resources 351, 353, 355, and 357. In this manner, should a failure occur in one of the pathways supplying power to particular computing device, power is still available through the alternate pathway supplying redundant power. By way of illustration only, failures in a pathway can be as severe as having a power controller going down, or as simple as the improper seating of a power cable to a socket or port. In either case, power would not be supplied through the power cable and a failure in power will occur.

The power cabling verifier 310 generates a report 330 that lists the results from the verification of the configuration of the power cabling for the computing resources in a network. The report 330 contains a plurality of messages that can be as thorough or as limited in scope as desired by the user. In one embodiment, the report lists every pass and exception result from testing each of the power cables to the computing resources. In another embodiment, the report lists only the exception results. In still another embodiment, the report 330 lists messages pertaining to a subset of computing resources in the pool of computing resources. That is, the report 330 lists messages pertaining to the test results for power cables supplying power to computing resources in a farm of computing resources.

Figure 4:
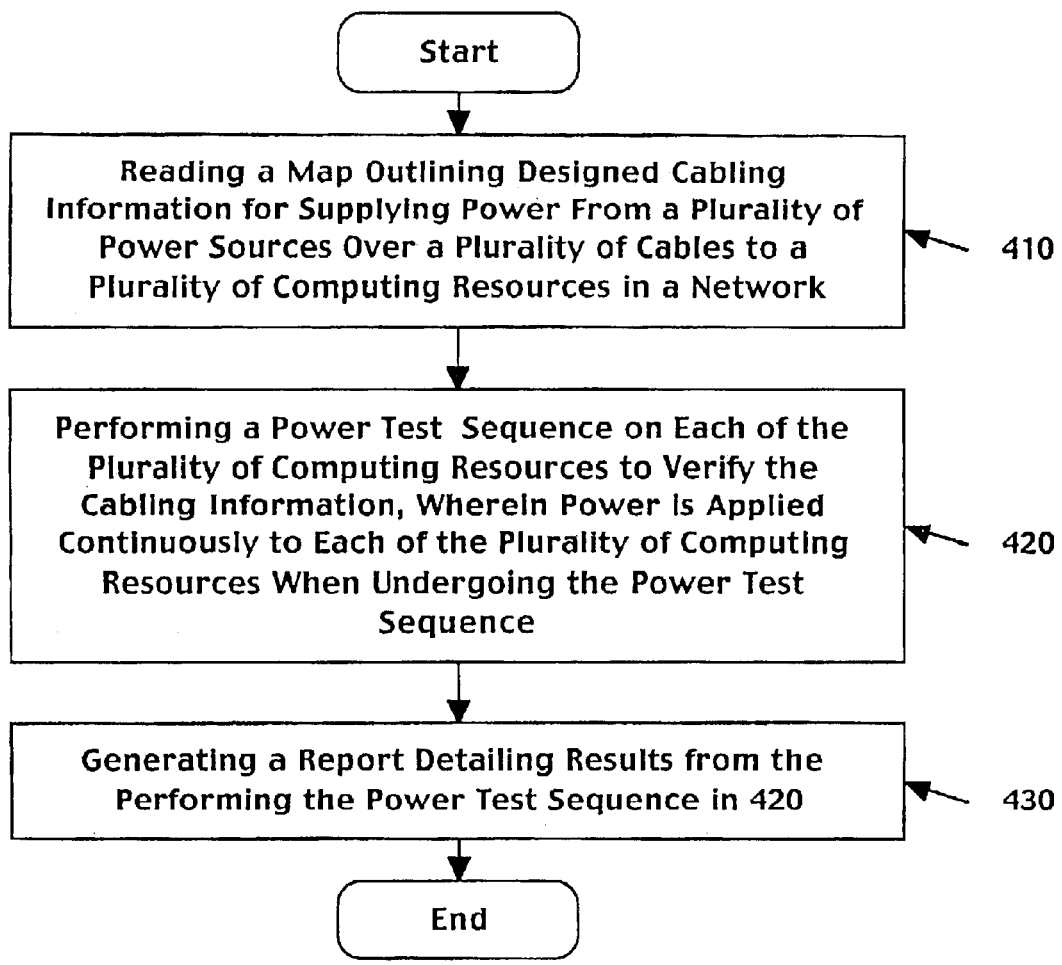
FIG. 4 is a flow chart illustrating steps in a computer implemented method for verifying the configuration of power cabling associated with computing resources in a data center, in accordance with one embodiment of the present invention.

Referring now to FIG. 4, a flow chart 400 illustrating steps in a method for verifying the configuration of a plurality of computing devices in a network is disclosed, in accordance with one embodiment of the present invention. The method described in flow chart 400 verifies the correctness of power cabling between automatic power controllers and network computing resources.

At 410, the present embodiment begins by reading a map outlining designed cabling information for applying power from a plurality of power sources over a plurality of cables to a plurality of computing resources in a network. As previously described, the map discloses the correct configuration for cabling power controllers to the plurality of computing resources. As such, the present embodiment is capable of identifying, for each of the plurality of power cables, a power source and a destination. The power source is associated with an identified power socket that is included within a source power controller. The destination is a computing resource to which power is applied from the source power controller via the identified power socket.

The power controllers manage power that is applied to the plurality of computing resources through a plurality of power sources (e.g., power sockets) in response to commands. The present embodiment is capable of issuing the commands to the power controllers for the application of power to specific power sources and for the disengagement of power from specific power sources. In one embodiment, the plurality of power sources comprises a plurality of power sockets in a plurality of automatic power controllers, wherein the plurality of automatic power controllers provide redundant power to the plurality of computing resources.

At 420, the present embodiment continues by performing a power test sequence on each of the plurality of computing resources to verify the cabling information. Specifically, the power test sequence verifies the correctness of the configuration of the cabling information.

In one embodiment, the power test sequence is performed independently on each of the computing resources in the network. That is, testing is accomplished one computing resource at a time in a network of interrelated computing resources to ensure the correctness of the results.

The present embodiment applies power continuously during implementation of the power test sequence. That is, while verifying the power cabling for a single computing resource in isolation, power is applied continuously to the computing resource during the power test sequence. This results in a increase in time and cost savings when performing a power cabling verification test. Instead of having to perform the power-up sequence for each power cable associated with a particular computing resource, as in methods of the prior art, the present embodiment is capable of verifying the correctness of the configuration of power cables associated with a particular computing device while only performing the power-up sequence once.

While the present embodiment discloses the independent performance of the power test sequence on each of the plurality of computing resources, other embodiments of the present invention are well suited to implementation of the power test sequence that is performed simultaneously on two or more computing devices.

At 430, the present embodiment continues by generating a report detailing results from performing the power test sequence on each of the plurality of computing resources. More specifically, the report provides a plurality of messages disclosing whether the power cables associated with the plurality of computing resources are properly configured.

In one instance, the present embodiment generates a separate pass message in the plurality of messages for each of the power cables that are verified to comply with designed power information as disclosed in the map. That is, the present embodiment generates a separate pass message for power cables that pass the power test sequence. As such, the actual configuration of verified power cables as tested (source power socket to destination computing resource) matches the configuration outlined in the map.

In another instance, the present embodiment generates a separate fail or exception message in the plurality of messages for each of the power cables that fail to comply with the designed power information as disclosed in the map. In essence, the exception message indicates that the power cable being tested has not been verified, and that power is not being supplied to the computing resource over the power cable being tested.

Figure 5:
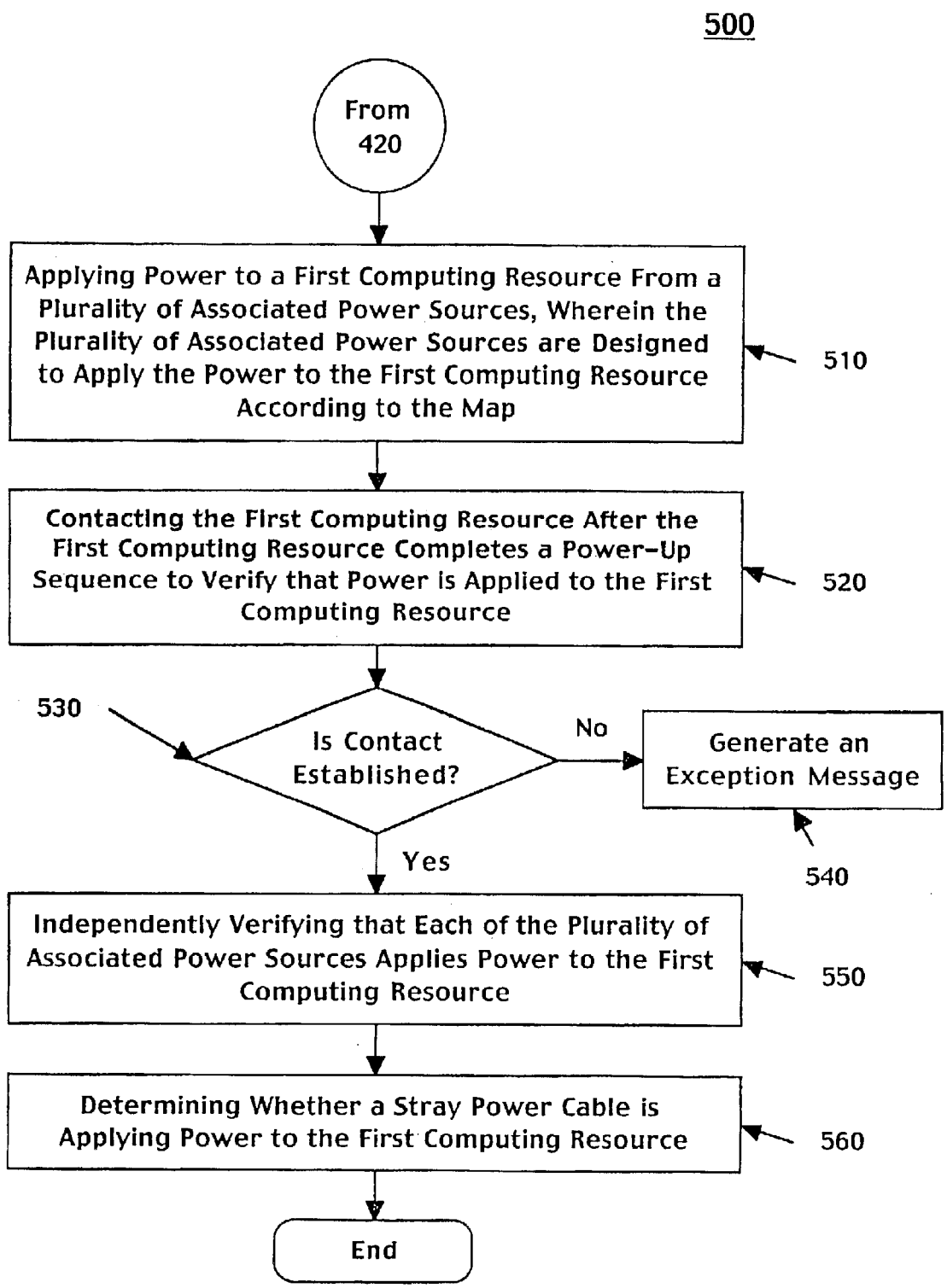
FIG. 5 a flow chart illustrating steps in a computer implemented method for verifying the configuration of power cabling associated with one computing resource in a data center, in accordance with one embodiment of the present invention.

Referring now to FIG. 5, a flow chart 500 illustrating steps in a computer implemented method for verifying the configuration of power cabling associated with one computing resource in a network is disclosed, in accordance with one embodiment of the present invention. The method described in flow chart 500 verifies the correctness of power cabling between one or more automatic power controllers and a single computing resource in a network. The method as disclosed in flow chart 500 is repeated for each of the plurality of computing resources in a network (e.g., a data center) for verification of the configuration of power cabling of the plurality of computing resources, in one embodiment.

The method as disclosed in flow chart 500 proceeds from 420 in flow chart 400, in accordance with one embodiment. From 420, the present embodiment begins by applying power to a first computing resource from a plurality of associated power sources, at 510. The present embodiment issues commands to the associated power controllers to apply power to the first computing resource. The first computing resource is the one selected for which the power test sequence is performed in order to verify its power cabling configuration. The plurality of associated power sources are designed to apply power redundantly to the first computing resource as disclosed by the map, as discussed in full previously.

At 520, the present embodiment waits for the first computing resource for a sufficient amount of time to complete a power-up sequence. The present embodiment then continues by contacting the first computing resource after the first computing resource completes its power-up sequence to verify that power is being applied to the first computing resource through any power source, whether by design or by error. Contact with the first computing resource is over a network pathway, in one embodiment.

At decision step 530, the present embodiment determines if contact is established with the first computing resource. If contact is established and the first computing resource is verified to be operating, from which a response from the first computing resource is received, then the present embodiment is ensured that power is being applied to the first computing resource, and the present embodiment proceeds to 550 to continue the power test sequence.

On the other hand, if contact is not established, from which no response is received, then the present embodiment is ensured that no power is being applied to the first computing resource. In this case, the present embodiment proceeds to 540 and generates an exception message. The exception message indicates that there is an error in the configuration of the power cabling to the first computing resource. By way of illustration only, exception message 1030 of FIG. 10 provides a general exception condition that discloses that the configuration of power sources to the first computing resource is improper; however, a specific power cable cannot be identified as the source of the problem.

At 550, the present embodiment independently verifies that each of the plurality of associated power sources applies power to the first computing resource. As such, the present embodiment tests each power cable applying power to the first computing resource one at a time, and independently from the other associated power cables that apply power to the first computing resource, according to the map by design. As discussed previously, the verification of the power cables is presented in a report listing a plurality of messages detailing results from the implementation of the power test sequence.

At 560, the present embodiment continues by determining whether a stray power cable is applying power to the first computing resource. If a stray power cable is applying power, then the results from implementation of the power test sequence are invalid since it is unclear whether the power cable being tested did in fact apply power to the first computing resource.

Figure 6:
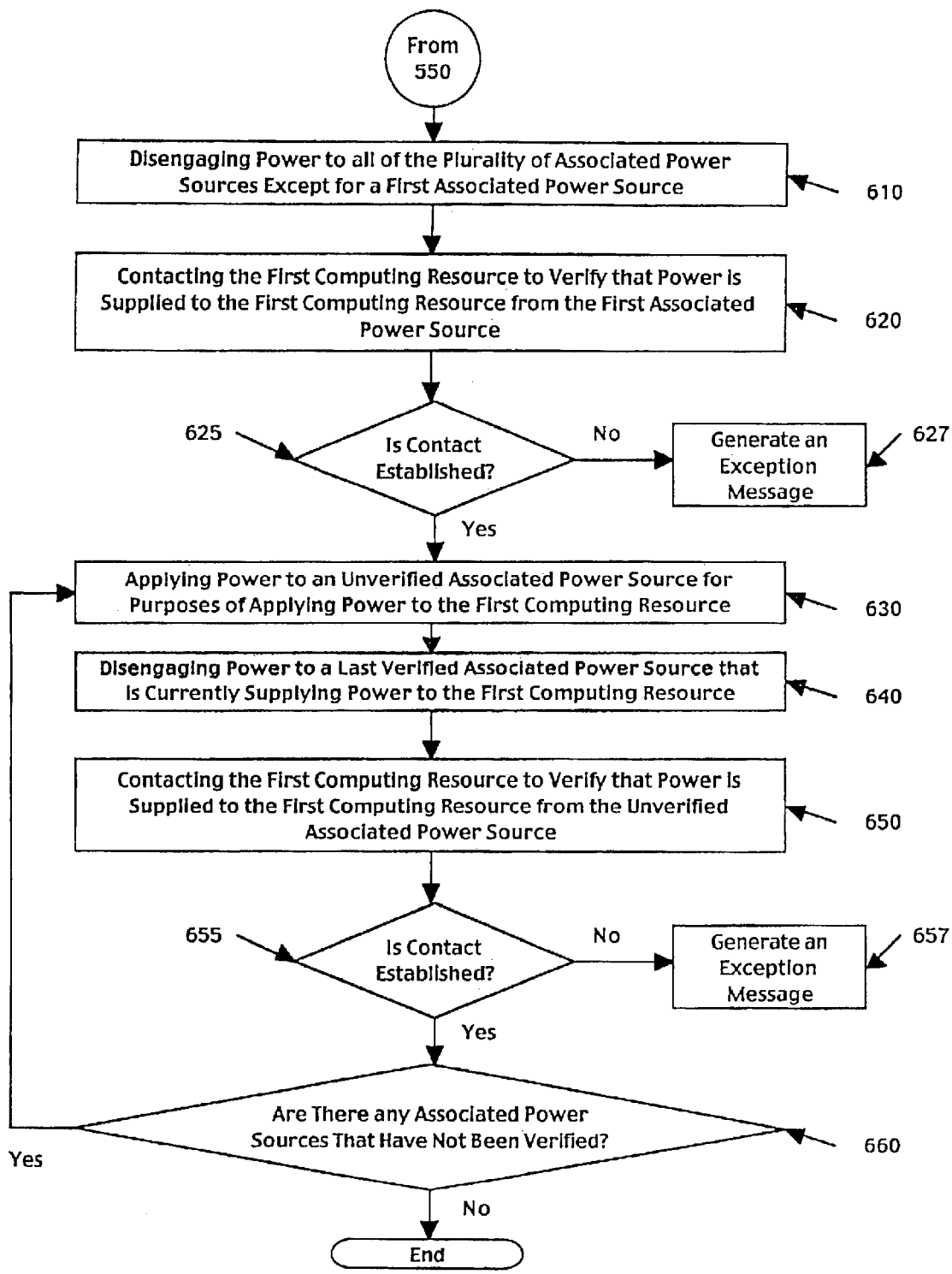
FIG. 6 is a flow chart illustrating steps in a computer implemented method for verifying that each of the power sources that apply power to a computing resource is properly configured, in accordance with one embodiment of the present invention.

Referring now to FIG. 6, a flow chart 600 illustrates steps in a computer implemented method for verifying that each of the power sources that apply power to a computing resource is properly configured, in accordance with one embodiment of the present invention. The method described in flow chart 600 verifies the correctness of power cabling between automatic power controllers and a single computing resource.

The method as disclosed in flow chart 600 proceeds from 550 in flow chart 500, in accordance with one embodiment. From 550, the present embodiment begins by disengaging power from all of the plurality of associated power sources except for a first associated power source, at 610. That is the power controllers are commanded to stop supplying power through all of the plurality of associated power sources except for the first associated power source. In this way, the present embodiment, according to the map, isolates the first associated power source for verification of its power cabling configuration.

At 620, the present embodiment continues by contacting the first computing resource to verify that power is being applied to the first computing resource from the first associated power source, according to the map that outlines the configuration of associated power sources supplying redundant power to the first computing resource.

At decision block 625, the present embodiment determines if contact is established with the first computing resource. If contact is established, from which a response from the first computing resource is received, then the present embodiment has verified that the first computing resource is operating. As such, the present embodiment is ensured that power is being applied to the first computing resource, and the present embodiment proceeds to 630 to continue the power test sequence.

At this point, the power cable configuration is presumably verified to be correct, as designed by the map. The verification is presumed to be correct since there still may be a stray source of power that has yet to be tested. Testing of the stray source of power will be discussed in full in relation to the flow chart 900 of FIG. 9.

On the other hand, if contact is not established, from which no response is received, then the present embodiment is ensured that no power is being applied to the first computing resource. In this case, the present embodiment proceeds to 627 and generates an exception message. The exception message indicates that there is an error in the configuration of the power cabling to the first computing resource. At this stage of the power test sequence, the information contained within the exception message provides detailed information that is helpful for repair. For example, the exception message identifies the source power socket (e.g., the first associated power source) of a particular power controller and the destination computing resource that is associated with a particular power cable over which no power is being applied.

By way of illustration only, exception message 1020 of FIG. 10 provides an exception condition that discloses that the configuration of a specific power source, namely the first associated power source, to the first computing resource is improper, as will be discussed in full below.

At 630, the present embodiment continues by applying power to an unverified associated power source. That is the present embodiment issues commands to the associated power controller to apply power to a power cable that has not been tested, and thus is unverified. By first applying power to the unverified associated power source, continuous power is applied to the first computing resource during testing. Previously, in the prior art all power was disengaged to the first computing resource before the next power cable to be tested was selected. On the other hand, the present embodiment is able to test power cables more efficiently, since only one power-up sequence is executed by the first computing resource.

At 640, the present embodiment continues by disengaging power from the last verified associated power source that is currently applying power to the first computing resource. As such, according to the map that outlines the proper configuration of power cables to the first computing resource, power is still being applied to the first computing device by the unverified associated power source.

At 650, the present embodiment continues by contacting the first computing resource to verify that power is being applied to the first computing resource from the unverified associated power source.

At decision block 655, the present embodiment determines if contact is established with the first computing resource. If contact is established, from which a response from the first computing resource is received, then the present embodiment has verified that the first computing resource is operating. As such, the present embodiment is ensured that power is being applied to the first computing resource, and the present embodiment proceeds to 660 to continue the power test sequence.

At this point, the power cable configuration for the first computing resource is presumably verified to be correct, as designed by the map. The verification is presumed to be correct since there still may be a stray source of power that has yet to be tested, as discussed previously. Testing of the stray source of power will be discussed in full in relation to the flow chart 900 of FIG. 9.

On the other hand, if contact is not established, from which no response is received, then the present embodiment is ensured that no power is being applied to the first computing resource. In this case, the present embodiment proceeds to 657 and generates an exception message. The exception message indicates that there is an error in the configuration of the power cabling to the first computing resource. By way of illustration only, exception message 1020 of FIG. 10 provides an exception condition that discloses that the configuration of a specific power source, namely the unverified associated power source, to the first computing resource is improper, as will be discussed in full below.

At decision block 660, the present embodiment determines whether there are any associated power sources that have not been verified by undergoing the power test sequence. If there are still unverified associated power sources, then the present embodiment returns to block 630 to continue testing. On the other hand, if all associated power sources have been tested, then the present embodiment presumably has verified the correctness of all of the associated power sources. The presumption is still made since stray power sources have not been tested, as previously discussed.

Figure 7:
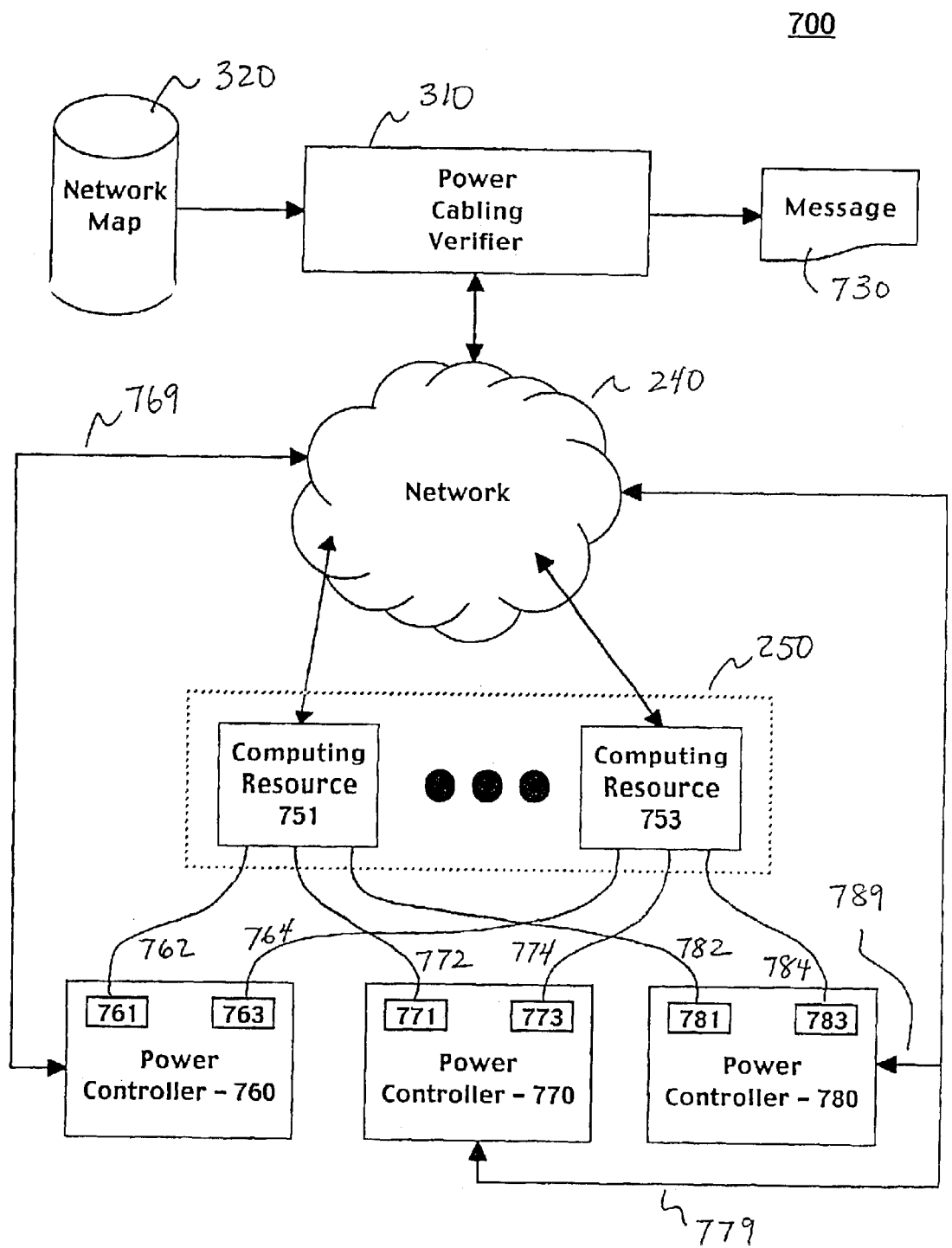
FIG. 7 is a data flow diagram illustrating the flow of information when verifying the configuration of power cabling to computing resource that require more than one source of power in a data center, in accordance with one embodiment of the present invention.

Referring now to FIG. 7, a data flow diagram illustrating the flow of information between several elements of a system 700 that reside within an UDC, in accordance with one embodiment of the present invention. The system 700 provides for the verification of the configuration of power cabling in a network of computing resources that require more than one power source to operate. By way of illustration only, the system 700 can reside on, or interact with, the UDC 210 of FIG. 2.

The system 700 is comprised of the power cabling verifier 310 and a network map 320, as fully discussed previously. The power cabling verifier 310 is coupled to the network 240 that is internal to the UDC 210 to provide communicable coupling with the pool 250 of computing resources (e.g., the computing resource 751, computing resources 753, etc.). The power cabling verifier 310 is capable of implementing a method for verifying the configuration of the power cabling supplying power to the pool 250 of computing resources, where the computing resources require more than one power sources to operate. In one embodiment, the cabling verifier 310 performs the verification automatically.

The system 700 is also comprised of a plurality of power controllers that supplies power to the pool 250 of computing resources. In FIG. 7, power controller 760, power controller 770, and power controller 780 supply power to the pool 250 of computing resources, power is continually available from each of the power controllers 760, 770, and 780 through their respective power sockets. For example, power controller 760 supplies and controls power through a plurality of power sockets, including power sockets 761 and 763. Power controller 770 supplies and controls power through a plurality of power sockets, including power sockets 771 and 773. Power controller 780 supplies and controls power through a plurality of power sockets, including power sockets 781 and 783.

In addition, in one embodiment, the power controllers 760, 770, and 780 supply power automatically in response to commands that dictate when to apply power through each of the power sockets and when to disengage power through each of the power sockets. The commands are initiated through the UDC that is controlling the power controllers 760, 770, and 780. As shown in FIG. 7, commands to power controller 760 are communicated through line 769. Commands to power controller 779 are communicated through line 779. Correspondingly, commands to power controller 780 are communicated through line 789.

The network map 320 is a machine-readable network map. The network map 320 contains power information pertaining to the configuration of power cabling supplying power to each of the computing resources in the pool 250, as discussed previously in full. Specifically, the power information contained within the network map 320 includes the configuration of the power cabling to each of the plurality of computing resources in the pool 250, and more particularly computing resource 751 and computing resource 753.

For example, power controller 760, 770, and 780 supply power to the computing resource 751 and computing resource 753 in the pool of computing resources 250. As such, the power information contains configuration information for power cables originating from power controllers 760, 770, and 780 and supplying power to the computing resources 751 and 753.

As shown in FIG. 7, three or more power controllers redundantly supply power to the computing resources 751 and 753. The computing resources 751 and 753 require more than one power source in order to operate. In particular, the computing resource 751 is supplied power from power source 761 of power controller 760 over cable 762, from power source 771 of power controller 770 over cable 772, and from power source 781 of power controller 780 over cable 782. Also, the computing resource 753 is supplied power from power source 763 of power controller 760 over cable 764, from power source 773 of power controller 770 over cable 774, and from power source 783 of power controller 780 over cable 784. In this manner, should a failure occur in one of the pathways supplying power to either of the computing resources 751 and 753, power would still be available through the remaining two pathways supplying power.

The power cabling verifier 310 generates a report 730 that lists the results from the verification of the configuration of the power cabling for the computing resources 751 and 753 in a network. The report 730 contains a plurality of messages that can be as thorough or as limited in scope as desired by the user. In one embodiment, the report lists every pass and exception result from testing each of the power cables to the computing resources. In another embodiment, the report lists only the exception results. In still another embodiment, the report 730 lists messages pertaining to a subset of computing resources in the pool 250 of computing resources, such as, for computing resources that require more than two power sources to operate.

Figure 8:
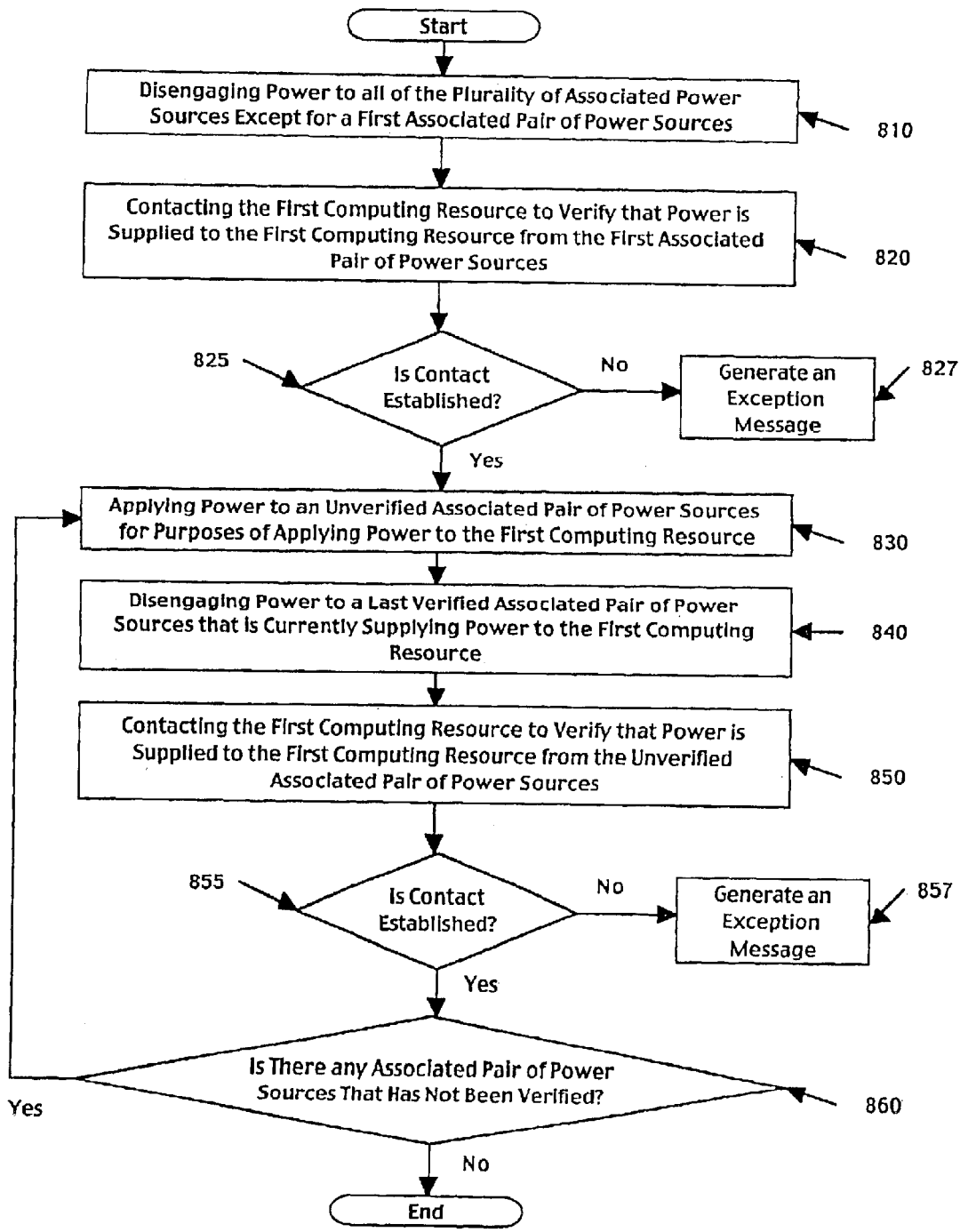
FIG. 8 is a flow chart illustrating steps in a computer implemented method for verifying the configuration of power cabling associated with computing resources that require more than one source of power in a data center, in accordance with one embodiment of the present invention.

Referring now to FIG. 8, a flow chart 800 illustrates steps in a computer implemented method for verifying that each of a pair of associated power sources that apply power to a computing resource that require at least two power sources to operate is properly configured, in accordance with one embodiment of the present invention. The method described in flow chart 800 verifies the correctness of power cabling between automatic power controllers and a single computing resource.

At 810, the present embodiment begins by disengaging power from all of the plurality of associated pairs of power sources supplying power to a first computing resource except for a first associated pair of power sources. That is the power controllers are commanded to stop supplying power through all of the plurality of associated pairs of power sources except for the first associated pair of power sources. In this way, the present embodiment, according to the map, isolates the first associated pair of power sources for verification of its power cabling configuration. For example, in FIG. 7, the first associated pair of power sources comprises power source 761 and 771. As such, power to power source 781 is cut off.

Prior to 810, the present embodiment verifies that power is being supplied to the first computing resource. This is accomplished by applying power to the first computing resource from each of the plurality of associated pairs of power sources. The first computing resource is the one selected from the pool of computing resources for which the power test sequence is performed in order to verify its power cabling configuration. The plurality of associated pairs of power sources is designed to apply power redundantly to the first computing resource as disclosed by the map, as discussed previously in full. For example, for computing resource 751 of FIG. 7, the power cabling verifier 310 would send commands to power controller 760, 770, and 780 to apply power over the power source ports 761, 771, and 781.

After a sufficient amount of time elapses for the first computing resource to complete its power up sequence, the present embodiment determines if contact can be made with the first computing resource. If contact is established and the first computing resource is verified to be operating, the present embodiment is ensured that power is being applied to the first computing resource, and the present embodiment proceeds to 810 to continue the power test sequence. On the other hand, if contact is not established, then the present embodiment is ensured that no power is being applied to the first computing resource. An exception message is generated to indicate that there is an error in the configuration of power cabling to the first computing resource. As an example, exception message 1030 of FIG. 10 provides a general exception condition that discloses that the configuration of power sources to the first computing resource is improper; however, specific pairs of power cables cannot be identified as the source of the problem.

At 820, the present embodiment continues by contacting the first computing resource to verify that power is being applied to the computing resource from the first associated pair of power sources, according to the map that outlines the configuration of associated pairs of power sources supplying redundant power to the first computing resource.

At decision block 825, the present embodiment determines if contact is established with the first computing resource. If contact is established, from which a response from the first computing resource is received, then the present embodiment has verified that the first computing resource is operating. As such, the present embodiment is ensured that power is being applied to the first computing resource, and the present embodiment proceeds to 830 to continue the power test sequence.

At this point, the power cable configuration is presumably verified to be correct, as designed by the map. The verification is presumed to be correct since there still may be a stray source of power that has yet to be tested. Testing of the stray source of power will be discussed in full in relation to the flow chart 900 of FIG. 9.

On the other hand, if contact is not established, from which no response is received, then the present embodiment is ensured that no power is being applied to the first computing resource. In this case, the present embodiment proceeds to 827 and generates an exception message. The exception message indicates that there is an error in the configuration of the power cabling to the first computing resource. At this stage of the power test sequence, the information contained within the exception message provides detailed information that is helpful for repair. For example, the exception message identifies the pair of source power sockets (e.g., the first associated pair of power sources) of particular power controllers and the destination computing resource that is associated with a particular power cables over which insufficient power is applied.

At 830, the present embodiment continues by applying power to an unverified associated pair of power sources. That is the present embodiment issues commands to the associated pair of power controllers to apply power to a pair of power cables that has not been tested, and thus is unverified. For example, from FIG. 7, unverified associated pairs of power sources include the following: power sources 761 and 781, and power sources 771 and 781. By first applying power to the unverified associated pair of power sources, continuous power is applied to the first computing resource during testing. Previously, in the prior art all power was disengaged to the first computing resource before the next pair of power cables to be tested was selected. On the other hand, the present embodiment is able to test power cables more efficiently, since only one power-up sequence is executed by the first computing resource.

At 840, the present embodiment continues by disengaging power from the last verified associated pair of power sources that is currently applying power to the first computing resource. As such, according to the map that outlines the proper configuration of power cables to the first computing resource, power is still being applied to the first computing device by the unverified associated pair of power sources.

At 850, the present embodiment continues by contacting the first computing resource to verify that power is being applied to the first computing resource from the unverified associated pair of power sources.

At decision block 855, the present embodiment determines if contact is established with the first computing resource. If contact is established, from which a response from the first computing resource is received, then the present embodiment has verified that the first computing resource is operating. As such, the present embodiment is ensured that power is being applied to the first computing resource, and the present embodiment proceeds to 860 to continue the power test sequence.

At this point, the power cable configuration for the first computing resource is presumably verified to be correct, as designed by the map. The verification is presumed to be correct since there still may be a stray source of power that has yet to be tested, as discussed previously. Testing of the stray source of power will be discussed in full in relation to the flow chart 900 of FIG. 9.

On the other hand, if contact is not established, from which no response is received, then the present embodiment is ensured that no power is being applied to the first computing resource. In this case, the present embodiment proceeds to 857 and generates an exception message. The exception message indicates that there is an error in the configuration of the power cabling to the first computing resource. The exception message provides an exception condition that discloses that the configuration of a specific pair of power sources, namely the unverified associated power source, to the first computing resource is improper.

At decision block 860, the present embodiment determines whether there is any associated pair of power sources that have not been verified by undergoing the power test sequence. For example, from FIG. 7, associated pairs of power sources that are tested for the computing resource 751 include the following: power sources 761 and 771, power sources 761 and 781, and power sources 771 and 781. If there is still an unverified associated pair of power sources, then the present embodiment returns to block 830 to continue testing. On the other hand, if all associated pairs of power sources have been tested, then the present embodiment presumably has verified the correctness of all of the associated pairs of power sources. The presumption is still made since stray power sources have not been tested, as previously discussed. In one embodiment, the method as disclosed in flow chart 800 can test for stray power cables after 860, when all associated pairs of power sources have been tested.

Figure 9:
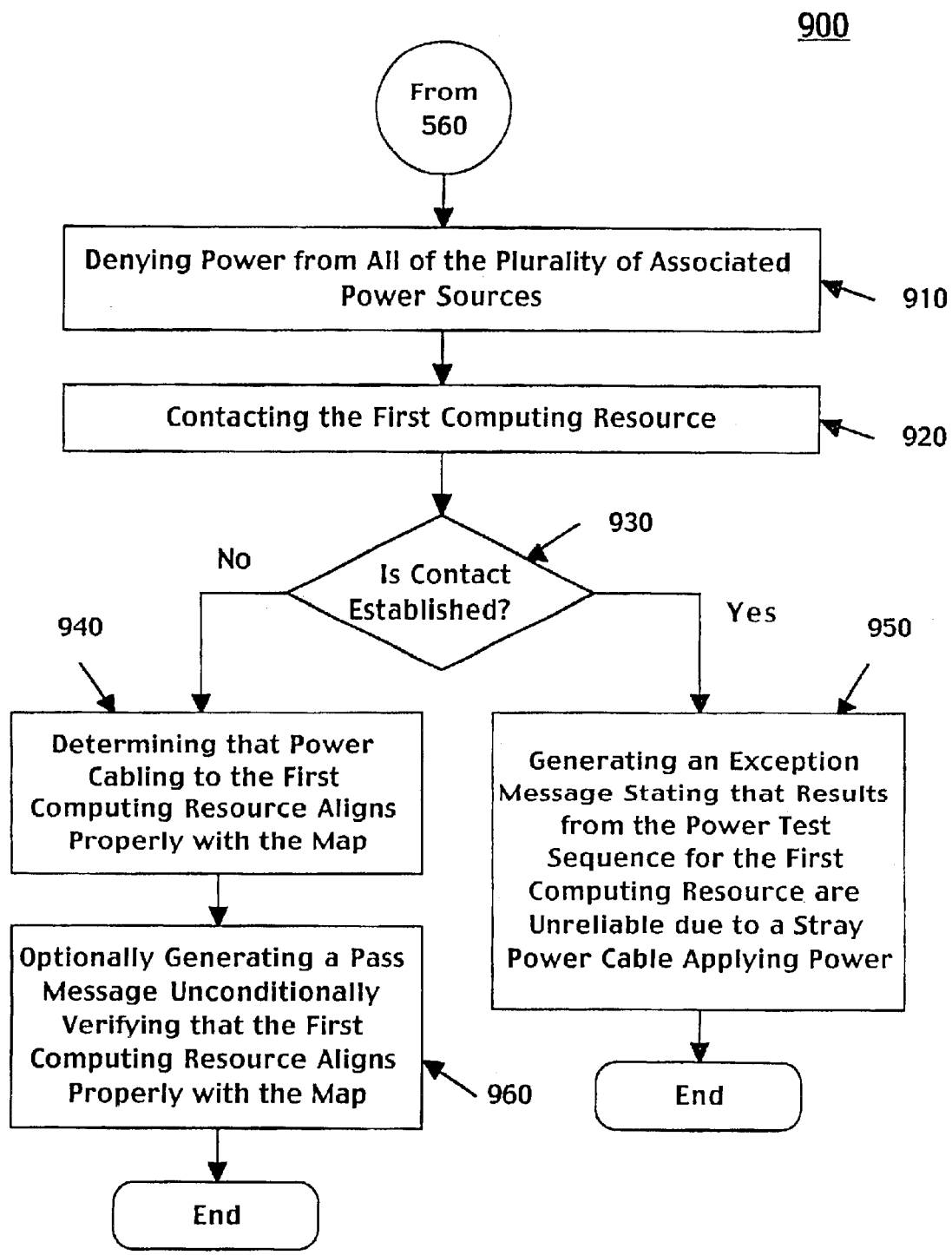
FIG. 9 is a flow chart illustrating steps in a computer implemented method for verifying that a stray power cable is not supplying a computing resource with power, in accordance with one embodiment of the present invention.

Referring now to FIG. 9, a flow chart 900 illustrates steps in a computer implemented method for verifying that a stray power cable is not supplying the first computing resource with power, in accordance with one embodiment of the present invention. Previously, the associated power sources had presumably been verified to follow the configuration outlined by the map. Flow chart 900 provides for unconditional verification of the associated power sources by testing for a stray power source.

The method as disclosed in flow chart 900 proceeds from 560 in flow chart 500, in accordance with one embodiment. The method as disclosed in flow chart 900 also proceeds from the successful verification of all the associated power sources after 860. The present embodiment disclosing flow chart 900 begins by disengaging power from all of the plurality of associated power sources, at 910. According to the map that outlines the proper configuration for the power sources that supply power to the first computing resource, no power should be applied to the first computing resource at this time.

At 920, the present embodiment continues by contacting the first computing resource. As such, the present embodiment is testing to see if power is still being applied to the first computing resource even though all the associated power sources have been disengaged so that, in fact, no power is applied to the first computing resource through the associated power sources.

At decision block 930, the present embodiment determines if contact is established with the first computing resource. If contact is not established, then the present embodiment determines that the power cabling to the first computing resource aligns with the proper configuration of the power cables outlined in the map, at 940. As such, the associated power sources are now unconditionally verified as having the proper configuration.

At 960, the present embodiment optionally generates a pass condition in the message that unconditionally verifies that the first computing resource aligns properly with the map. By way of illustration only, the message 1010 illustrates the pass condition.

On the other hand, if contact is established, then the present embodiment continues by generating an exception message, at 950. The exception message states that results from the power test sequence for the first computing resource are unreliable due to the presence of power from a stray power source through a stray power cable. That is, a power cable is incorrectly coupled to the first computing resource, and is improperly applying power. By way of illustration, the message 1040 illustrates the exception condition of a stray power cable.

Power cables that are inserted into an incorrect receiving power socket of a computing resource produces the potential for a stray power cable. Although there is not enough information to determine which is the originating power source of the stray power cable, as more verification of power cabling configuration results are presented in a report, the identity of the stray power source occurs, in one embodiment. Problems with configuration of power cabling occurs in pairs or sets. Identification of these pairs or sets of problems leads to information suggesting how the error can be corrected, in one embodiment.

Referring now to FIG. 10, an illustration of a report 1000 is disclosed, in accordance with one embodiment of the present invention. Report 1000 illustrates a plurality of messages indicating pass conditions and exception conditions, four of which are presented in report 1000, pass message 1010, exception message 1020, exception message 1030, and exception message 1040.

In report 1000, exemplary message 1010 illustrates a pass condition 1012 for a power cable that is unconditionally verified to comply with designed power information as disclosed in the map. In pass message 1010, the relevant information includes an identification of the following: the power cable 1014 that supplies power to the corresponding computing resource 1018; the power socket as a power source 1016 that supplies power to the power cable 1014; and a listing of the computing resource 1018 as a destination of the power cable 1014.

In report 1000, exemplary message 1020 illustrates an exception condition 1022 that is associated with a specific power source and power cable. The information the information contained within the exception message 1020 provides detailed information that is helpful for repair. For example, the exception message isolates and identifies the source power socket, as the unverified power source, of a particular power controller and the destination computing resource that is associated with a particular power cable over which no power is being applied. In exemplary exception message 1020, the relevant information includes an identification of the following: the power cable 1024 that supplies power to the corresponding computing resource 1028; the power socket as a power source 1026 that supplies power to the power cable 1024; and a listing of the computing resource 1028 as a destination of the power cable 1024.

In report 1000, exemplary message 1030 illustrates an exception condition 1032 that is generally applied to all power sources applying power to a specific computing resource 1034. The exemplary message 1030 also lists the computing resource 1034 to identify which device is generating the exception.

In report 1000, exemplary message 1040 illustrates an exception condition 1042 that discloses a stray power cable is supplying power to the first computing resource. The exemplary message 1040 also lists the computing resource 1044 to identify which device is generating the exception. As described previously, the exception message 1040 states that results from the power test sequence for the first computing resource are unreliable due to the presence of power from a stray power source through a stray power cable.

In another embodiment, the methods as described in flow charts 400, 500, 600, 800 and 900 are performed automatically. In that case, the power cabling verifier can perform tests automatically to verify the correctness of the configuration of power cabling to computing resources in the network, e.g., a provisional data center. The checks can be done on all of the computing resources, or on particular areas of the network. For example, the verification of power cabling configuration can be isolated to checking only firewalls in the network. Still in another embodiment, the verification of power cabling configuration can be isolated to checking only computing resources of a specific farm of the network.

While the methods of embodiments illustrated in flow charts 400, 500, 600, 800, and 900 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A method and system for verifying the correctness of the configuration of power cabling of computing resources in a network is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for verifying network device power cabling configuration comprising:

a) reading a map outlining designed cabling information for applying power from a plurality of power sources over a plurality of cables to a plurality of computing resources in a network;

b) performing a power test sequence on each of said plurality of computing resources to verify said cabling information, wherein power is applied continuously to each of said plurality of computing resources when undergoing said power test sequence; and c) generating a report detailing results from said performing said power test sequence in b).

2. The method as described in claim 1, further comprising:
automatically performing said receiving said map in a), said performing said power test sequence in b), and said generating said report in c).

3. The method as described in claim 1, wherein a) further comprises:
identifying for each of said plurality of power cables a source power socket that is associated with a source power controller, and a destination computing resource.

4. The method as described in claim 1, wherein said plurality of power sources comprises a plurality of power sockets in a plurality of automatic power controllers, wherein said plurality of automatic power controllers provide redundant power to said plurality of computing resources.

5. The method as described in claim 1, wherein b) in said power test sequence further comprises:

b1) applying said power to a first computing resource from a plurality of associated power sources, said plurality of associated power sources designed to apply said power to said first computing resource according to said map;

b2) independently verifying that each of said plurality of associated power sources applies said power to said first computing resource; and b3) determining whether a stray power cable is applying said power to said first computing resource.

6. The method as described in claim 5, wherein b1) further comprises:
contacting said first computing resource after said first computing resource completes a power-up sequence to verify that said power is applied to said first computing resource.

7. The method as described in claim 5, wherein b2) further comprises:

i) disengaging said power from all of said plurality of associated power sources except for a first associated power source;

ii) contacting said first computing resource to verify that said power is applied to said first computing resource from said first associated power source;

iii) applying power to an unverified associated power source for purposes of applying said power to said first computing resource;

iv) disengaging said power from a last verified associated power source that is currently applying said power to said first computing resource;

v) contacting said first computing resource to verify that said power is being applied to said first computing resource; and vi) repeating said applying in iii), said disengaging in iv), and said contacting in said v) until all of said plurality of associated power sources have been verified to apply said power to said first computing resource.

8. The method as described in claim 5, wherein b3) further comprises:

i) disengaging said power from all of said plurality of associated power sources;

ii) contacting said first computing resource;

iii) determining that cabling to said first computing resource aligns properly with said map if no contact is made in ii); and iv) generating an exception report stating that results from said power test sequence for said first computing resource is unreliable when contact is made in ii) due to said stray power cable applying said power.

9. The method as described in claim 1, wherein b) in said power test sequence further comprises:

b1) applying said power to a first computing resource from a plurality of associated pairs of power sources, said plurality of associated pairs of power sources designed to apply said power to said first computing resource according to said map;

b2) independently verifying that each of said plurality of pairs of associated power sources applies said power to said first computing resource; and b3) determining whether a stray power cable is applying said power to said first computing resource.

10. The method as described in claim 1, wherein c) comprises:
generating a separate pass message in said report for each of said plurality of power cables that is verified to follow said cabling information; and
generating a separate exception message in said report for each of said plurality of power cables that is not verified to follow said cabling information.

11. The method as described in claim 1, wherein said network comprises a provisional data center.

12. A method for verifying network device power cabling configuration comprising:

a) reading a map outlining designed cabling information for applying power from a plurality of power sources over a plurality of cables to a plurality of computing resources in a network;

b) applying said power to a first computing resource from a plurality of associated power sources, said plurality of associated power sources designed to apply said power to said first computing resource according to said map;

c) independently verifying that each of said plurality of associated power sources applies said power to said first computing resource while maintaining a continuous application of said power to said first computing resource; and e) generating a plurality of messages detailing results from said independently verifying in c).

13. The method as described in claim 12, further comprising:
automatically performing said reading in a), said applying in b), said independently verifying in c), said repeating in d), and said generating in e).

14. The method as described in claim 12, wherein a) further comprises:
identifying for each of said plurality of power cables a source power socket associated with a source power controller and a destination computing resource, wherein a plurality of power controllers applies said power to said plurality of computing resources.

15. The method as described in claim 12, wherein b) in said power test sequence further comprises:

contacting said first computing resource after said first computing resource completes a power-up sequence to verify that said power is applied to said first computing resource.

16. The method as described in claim 12, wherein c) further comprises:
   c1) disengaging said power from all of said plurality of associated power sources except for a first associated power source;
   c2) contacting said first computing resource to verify that said power is applied to said first computing resource from said first associated power source;
   c3) applying power to an unverified associated power source for purposes of applying said power to said first computing resource;
   c4) disengaging said power from a last verified associated power source that is currently applying said power to said first computing resource;
   c5) contacting said first computing resource to verify that said power is applied to said first computing resource from said unverified computing resource; and
   c6) repeating said applying in iii), said disengaging in iv), and said contacting in said v) until all of said plurality of associated power sources have been verified to apply said power to said first computing resource.

17. The method as described in claim 16, further comprising:
   f) disengaging said power from all of said plurality of associated power sources;
   g) contacting said first computing resource;
   h) determining that cabling to said first computing resource aligns properly with said map if no contact is made in g); and
   i) generating an exception report in said plurality of messages stating that results from said power test sequence for said first computing resource is unreliable when contact is made in g) due to an unknown power source applying said power.

18. The method as described in claim 12, further comprising:
   f) applying said power to a second computing resource from a second plurality of associated power sources, said second plurality of associated power sources designed to apply said power to said second computing resource according to said map;
   g) independently verifying that each of said second plurality of associated power sources applies said power to said second computing resource while maintaining a continuous application of said power to said second computing resource; and
   h) generating a second plurality of messages detailing results from said independently verifying in g).

19. The method as described in claim 12, wherein said network comprises a provisional data center.

20. A computer system comprising:
   a bus for communicating information associated with a method for verifying power cabling;
   a processor coupled to said bus for processing said information associated with said method for verifying network device power cabling; and
   a computer readable memory coupled to said processor containing program instructions, that when executed by said processor, implement said method for verifying network device power cabling configuration comprising:
   a) reading a map outlining designed cabling information for applying power from a plurality of power sources over a plurality of cables to a plurality of computing resources in a network;
   b) performing a power test sequence on each of said plurality of computing resources to verify said cabling information, wherein power is applied continuously to each of said plurality of computing resources when undergoing said power test sequence; and
   c) generating a report detailing results from said performing said power test sequence in b).

21. The computer system as described in claim 20, wherein said method further comprises:
   automatically performing said receiving said map in a), said performing said power test sequence in b), and said generating said report in c).

22. The computer system as described in claim 20, wherein a) in said method further comprises:
   identifying for each of said plurality of power cables a source power socket that is associated with a source power controller, and a destination computing resource.

23. The computer system as described in claim 20, wherein said plurality of power sources comprises a plurality of power sockets in a plurality of automatic power controllers, wherein said plurality of automatic power controllers provide redundant power to said plurality of computing resources.

24. The computer system as described in claim 20, wherein b) in said method in said power test sequence further comprises:
   b1) applying said power to a first computing resource from a plurality of associated power sources, said plurality of associated power sources designed to apply said power to said first computing resource according to said map;
   b2) independently verifying that each of said plurality of associated power sources applies said power to said first computing resource; and
   b3) determining whether a stray power cable is applying said power to said first computing resource.

25. The computer system as described in claim 24, wherein b1) in said method further comprises:
   contacting said first computing resource after said first computing resource completes a power-up sequence to verify that said power is applied to said first computing resource.

26. The computer system as described in claim 24, wherein b2) in said method further comprises:
   i) disengaging said power from all of said plurality of associated power sources except for a first associated power source;
   ii) contacting said first computing resource to verify that said power is applied to said first computing resource from said first associated power source;
   iii) applying power to an unverified associated power source for purposes of applying said power to said first computing resource;
   iv) disengaging said power from a last verified associated power source that is currently applying said power to said first computing resource;
   v) contacting said first computing resource to verify that said power is being applied to said first computing resource; and
   vi) repeating said applying in iii), said disengaging in iv), and said contacting in said v) until all of said plurality of associated power sources have been verified to apply said power to said first computing resource.

27. The computer system as described in claim 24, wherein b3) in said method further comprises:
   i) disengaging said power from all of said plurality of associated power sources;
   ii) contacting said first computing resource;
   iii) determining that cabling to said first computing resource aligns properly with said map if no contact is made in ii); and
   iv) generating an exception report stating that results from said power test sequence for said first computing resource is unreliable when contact is made in ii) due to said stray power cable applying said power.

28. The computer system as described in claim 20, wherein b) in said method in said power test sequence further comprises:
   b1) applying said power to a first computing resource from a plurality of associated pairs of power sources, said plurality of associated pairs of power sources designed to apply said power to said first computing resource according to said map;
   b2) independently verifying that each of said plurality of pairs of associated power sources applies said power to said first computing resource; and
   b3) determining whether a stray power cable is applying said power to said first computing resource.

29. The computer system as described in claim 20, wherein c) in said method comprises:
   generating a separate pass message in said report for each of said plurality of power cables that is verified to follow said cabling information; and
   generating a separate exception message in said report for each of said plurality of power cables that is not verified to follow said cabling information.

30. The computer system as described in claim 20, wherein said network comprises a provisional data center.

* * * * *